(12) United States Patent
Hariton et al.

(10) Patent No.: US 7,953,175 B2
(45) Date of Patent: May 31, 2011

(54) USB SYSTEM WITH SPREAD SPECTRUM EMI REDUCTION

(75) Inventors: Dan Hariton, Pinole, CA (US); Narendar Venugopal, San Jose, CA (US); Duoc Nguyen, San Jose, CA (US); Santosh K. Panigrahi, Orissa (IN); Gautam K. Singh, Bangalore (IN); Sushl Kumar, Bangalore (IN)

(73) Assignee: ON Semiconductor Trading, Ltd., Hamilton (BM)

( * ) Notice: Subject to any disclaimer, the term of this patent is extended or adjusted under 35 U.S.C. 154(b) by 952 days.

(21) Appl. No.: 11/881,416

(22) Filed: Jul. 27, 2007

(65) Prior Publication Data

US 2009/0028218 A1    Jan. 29, 2009

(51) Int. Cl.
*H04L 27/00* (2006.01)

(52) U.S. Cl. .................................... 375/295

(58) Field of Classification Search ............ 375/130, 375/138, 140, 141, 146, 147, 148, 226, 242, 375/376, 295, 296; 710/100, 105, 106, 300, 313, 18, 261; 713/322, 500, 600

See application file for complete search history.

(56) References Cited

U.S. PATENT DOCUMENTS

| | | | |
|---|---|---|---|
| 6,597,226 B1 * | 7/2003 | Eade et al. | 327/292 |
| 7,434,083 B1 * | 10/2008 | Wilson | 713/600 |
| 2004/0131113 A1 * | 7/2004 | Rao | 375/226 |
| 2005/0235172 A1 * | 10/2005 | Ohie et al. | 713/323 |
| 2006/0158268 A1 * | 7/2006 | McCorquodale et al. | 331/34 |
| 2007/0063776 A1 * | 3/2007 | Okuda | 331/16 |
| 2008/0046775 A1 * | 2/2008 | Chien | 713/500 |

\* cited by examiner

*Primary Examiner* — David C. Payne
*Assistant Examiner* — Syed Haider
(74) *Attorney, Agent, or Firm* — Kevin B. Jackson

(57) ABSTRACT

A method for applying spread spectrum noise reduction techniques to USB specifically USB2.0 communications systems includes the step of generating a base (seed) frequency for the USB system, modulating the base (seed) frequency with a spread spectrum (SS) characteristic, and utilizing (as-is, not modified) the existing ASIC that multiplying the now modulated base (seed) frequency to generate the USB standard frequency signaling rate of 480 MHz with the SS characteristic within the USB standard specification for frequency deviation.

3 Claims, 5 Drawing Sheets

| MR [kHz] | Band -4 [dB] | Band -3 [dB] | Band -2 [dB] | Band -1 [dB] | Center 0 [dB] | Band 1 [dB] | Band 2 [dB] | Band 3 [dB] | Band 4 [dB] | MAX Peak [dB] | ATTN [dB] |
|---|---|---|---|---|---|---|---|---|---|---|---|
| 0 | | | | | 17.55 | | | | | 17.55 | 0.00 |
| 150 | | | 0.72 | 11.13 | 14.08 | 11.47 | 0.75 | | | 14.08 | 3.47 |
| 140 | | | 2.00 | 12.04 | 13.66 | 11.55 | 1.06 | | | 13.66 | 3.89 |
| 130 | | | 3.17 | 12.53 | 13.06 | 11.58 | 2.30 | | | 13.06 | 4.49 |
| 125 | | | 3.70 | 12.26 | 12.68 | 12.94 | 3.09 | | | 12.94 | 4.61 |
| 120 | | | 4.19 | 12.94 | 12.19 | 11.89 | 3.89 | | | 12.94 | 4.61 |
| 110 | | | 5.02 | 13.32 | 11.09 | 12.38 | 5.21 | | | 13.32 | 4.23 |
| 100 | | | 5.77 | 13.51 | 9.40 | 12.91 | 6.45 | | | 13.51 | 4.04 |
| 90 | | | 6.42 | 13.58 | 6.72 | 13.25 | 7.58 | | | 13.58 | 3.97 |
| 85 | | 0.00 | 7.06 | 12.68 | 4.64 | 13.21 | 8.11 | 0.91 | | 13.21 | 4.34 |
| 80 | | 1.89 | 8.04 | 13.40 | 1.55 | 13.28 | 8.57 | 1.55 | | 13.40 | 4.15 |
| 75 | | 2.38 | 8.91 | 12.64 | 0.00 | 12.64 | 8.94 | 2.42 | | 12.64 | 4.91 |
| 70 | | 3.70 | 9.70 | 12.64 | 0.00 | 12.79 | 9.25 | 4.11 | | 12.79 | 4.76 |
| 65 | | 5.13 | 10.45 | 11.85 | 0.00 | 11.36 | 9.47 | 4.04 | | 11.85 | 5.70 |
| 60 | | 5.21 | 11.02 | 10.75 | 3.36 | 11.17 | 9.89 | 6.38 | | 11.17 | 6.38 |
| 55 | 1.17 | 7.58 | 11.32 | 9.17 | 6.98 | 8.19 | 10.45 | 7.25 | 1.32 | 11.32 | 6.23 |
| 50 | 2.68 | 8.11 | 11.28 | 5.47 | 9.36 | 6.11 | 10.68 | 8.19 | 3.36 | 11.28 | 6.27 |
| 45 | 4.04 | 9.28 | 10.53 | 0.00 | 10.72 | 0.00 | 10.19 | 9.74 | 5.25 | 10.72 | 6.83 |
| 40 | 6.26 | 10.15 | 8.38 | 0.00 | 10.87 | 0.00 | 8.30 | 9.06 | 6.83 | 10.87 | 6.68 |

FIG. 2

USB SYSTEM WITH SPREAD SPECTRUM EMI REDUCTION

CROSS-REFERENCE TO RELATED APPLICATIONS

Not applicable

FEDERALLY SPONSORED RESEARCH

Not applicable.

SEQUENCE LISTING, ETC ON CD

Not applicable.

BACKGROUND OF THE INVENTION

1. Field of the Invention

This invention relates to the Universal Service Bus (USB) communications standard that is well-known and well-regarded in the prior art and, more particularly, to the use of spread spectrum techniques to improve the electromagnetic noise characteristics of USB2.0 systems, which is not known in the prior art.

2. Description of Related Art

The USB communications standard has been created to serve as a computer data link that may be applied between computers and peripheral devices from widely differing manufacturers and sources. To serve this purpose, it has been circumscribed by highly defined standards, and any computer or peripheral device claiming to be USB-compatible must pass strict testing procedures to assure compliance with these standards. It is important to understand in detail the two specification-related measurements and validation (pass/fail) procedures. Regarding USB 2.0 standards, the following restrictions pertain:

1) The Signaling Rate is 480 MHz±240 KHz, that may be expressed as 480 MHz±0.05%, or ±500 ppm, and it represents an average bit speed. The signaling rate is an average. It is measured according to the USB2.0 specification by sending a fixed bit-length packet (fixed-length specific test pattern of 0's and 1's) lasting a specific length of time. The average speed is a computation result arrived at by dividing the total length of time that it takes to transmit the fixed length test packet to the number of bits in the packet. Due to physical imperfections of the transmitter, and the receiver, and of the USB2.0 cable itself, the individual test-packet bits may exceed the limits of the signaling rate. However the test-packet average must always be the within a limit of +/−500 ppm. In other words, while individual bits may violate the signaling rate limits at an individual bit-length level, the overall average frequency of the test packet must be within the +/−500 ppm specified limits. In this averaging context, a bit that has an odd duration will be averaged out, and the whole test data packet will pass the signaling limit specification of +/−500 ppm.

2) Every USB 2.0 device must pass the eye diagram test. The Eye is a mathematical transformation applied to each individual bit received in the test packet (each bit been measured from zero crossing to the next zero crossing). This mathematical transformation is done using MatLab™. This Eye Diagram specification of the USB2.0 bus states that no bit rising edges or bit falling edges (bit transitions) should occur inside certain "quiet" time interval also known as the Eye Opening. The Eye Diagram, Eye Opening interval is being described in terms of "unit interval" (UI), meaning one-bit duration. The USB2.0 specification has ample descriptions of these definitions and how to measure them. It is important to remember that, for the Eye Diagram, each individual bit transition counts and is being plotted and measured. There is no average function being performed on any of the bits.

The Eye Diagram analysis, and the tight USB2.0 Specification for the signaling rate, described above, make it obvious for any skilled professional well versed in the art that deliberately varying the 480 MHz center or average data signaling frequency will result in USB2.0 equipment failing the specification tests and such equipment being denied certification.

Thus spread spectrum techniques, which reduce electromagnetic noise spectral levels in the signal, have not been applied to the USB system. Rather, other measures have been adopted to limit or attenuate the inevitable electromagnetic noise within the system that is the inevitable and inescapable result of multiple Fourier harmonics generated by the square wave transitions of the 480 MHz signal. For example, as shown in FIG. 1, a typical USB cable 11 often includes at least one cylindrical housing 12 received about the cable adjacent to one end thereof. The housing contains a ferrite sleeve through which the cable conductor extends. The ferrite material serves as an inductive choke to attenuate some of the harmonics and limit their propagation along the cable. As a result, the USB signal is "cleaner" than it would be otherwise. However, the signal harmonics, in addition to other factors, limit the useful length of USB cables to a few meters. Beyond that limit, the attenuated signal cannot be distinguished from the EM noise with sufficient accuracy to serve as a reliable data path.

BRIEF SUMMARY OF THE INVENTION

The present invention generally comprises a method for applying spread spectrum noise reduction techniques to USB communications systems without violating the strict USB standards.

Spread spectrum EMI suppression is well known in the prior art as a general technique with wide spread percentage specifications. These wide percentage specifications can be described as being center-spread or down-spread. The percentage frequency deviation factor typically ranges from a high of +/−5% to a low of +/−0.25% (for center spread) and ranges from a high of −5% to a low of −0.25% (for down spread). Resulting EMI [dB] attenuations range from −6 dB to −20 dB.

The present invention utilizes spread-spectrum techniques that are an order of magnitude lower in terms of percentage frequency deviations. These are considered to have "inefficient EMI [dB] attenuation/reduction" according to the conventional wisdom in spread spectrum EMI design, due mainly to the extremely low percentage frequency deviation. However, working within the limits of +/−0.05% frequency deviation or +/−500 ppm frequency deviation that is permitted by the USB 2.0 standards, and utilizing either random modulation, or any other modulation profile, the present invention was able to pass USB2.0 certification for a specific modulation profile. In one embodiment it has been graphically determined that for a triangular profile, for instance having a modulation rate around 125 KHz, an attenuation of −4.60 dB can be achieved for the fundamental center frequency of 480 MHz and −14 dB of attenuation for the $11^{th}$ harmonic.

In addition, the Eye Diagram tests have been passed, and there was no adverse effect upon the bit-error rate. No adverse effects were observed while monitoring the packet-error rate for continuous time intervals of 48 hours.

The overall USB2.0 jitter specification is close to these limits, +/−200 ppm. The spread-spectrum method of the invention reaches the realm of jitter, performing jitter modulation, with femtosecond control ability, without actually affecting any USB2.0 jitter specifications. The invention has no lower percentage frequency deviation limits, being capable of creating from a high number of picoseconds jitter modulation, to a low number of femtoseconds jitter modulation.

An independent third-party company specializing in the USB2.0 Specification and certification of devices has independently confirmed that the hardware created in accordance with this invention is fully compliant with the USB2.0 specification, that it passes all the USB2.0 requirements and that it passes specifically the data signaling rate and it passes the Eye Diagram limits. In the process of spreading the spectrum of the USB2.0 signaling rate, fundamental frequency and harmonic component amplitude attenuation is being achieved, as a function of MR, the modulation rate or frequency. This frequency modulation could be a random, a pseudo random sequence, a random profile, or have a designed regular profile etc.

The USB 2.0 clock frequency of 480 MHz is typically generated by first generating a base (seed) frequency, for example 48 MHz, and then employing a PLL circuit to multiply that frequency by a factor of 10. In one embodiment of this invention the spread spectrum for USB2.0 is applied to 48 MHz input clock waveform, whereby the spread spectrum effect is likewise increased by the PLL multiplier circuit. Alternatively, the base (seed) frequency generator may be set for 12 MHz, 24 MHz, 25 MHz, or 48 MHz, and the incoming clock signal is spread spectrum modulated for USB2.0 applications. Multiplications of 40×, 20×, 19.2×, or 10× (respectively) follows, such that a resulting 480 MHz spread spectrum data rate frequency is synthesized. This resulting 480 MHz frequency has spread-spectrum being maintained through the process of 10×, 19.2×, 20× or 40× frequency synthesis. Alternately the seed frequency can be 10 MHz or 20 MHz or 40 MHz, and the multiplier may be 48× or 24× or 12×, etc. In all cases the base (seed) frequency (lower by a factor of magnitude than 480 MHz) has spread-spectrum (within the scope of this disclosure and patent application). The important relationship is that the seed frequency and the multiplication factor produce the 480 Mhz data signal.

The 48 MHz clock with spread spectrum modulation is being applied to, and being multiplied by USB2.0 ASICs (application specific integrated circuits) or SATA&USB2.0 ASICs in existing systems that have no USB spread-spectrum characteristics. These systems have a base (seed) frequency clock input that is not spread spectrum modulated. It is significant for the present invention that existing hardware multiplication devices (i.e., from the preexisting ASIC) pass the spread-spectrum modulation in like-multiplied, undisturbed fashion to the output 480 MHz frequency. The seed (base) frequency with spread spectrum (profile) present has the advantage that its (seed) frequency deviation is much less than the ASIC multiplier PLL bandwidth. Thus the spread spectrum profile passes through the ASIC linearly-multiplied but not distorted.

From a silicon design point of view it is economically more costly to implement spread spectrum directly at 480 MHz, since there are physical and design impediments and higher on-silicon interference/noise. It is much simpler to implement spread spectrum at 48 MHz and rely on existing circuit (ASIC) hardware to perform frequency multiplication (such as a PLL X10 device). In addition, by having an understanding of this (non-spread-spectrum) already existing frequency multiplication, the base frequency with applied spread-spectrum passes through, is multiplied, and the spread spectrum remains present at the high-frequency (480 MHz) output. The multiplication of the incoming 48 MHz must have very narrow control specifications that have not been addressed in the prior art. This concept of modulation scheme and hardware implementation-and-control allows a realization for the first time of USB2.0 systems with spread spectrum that are compliant with the existing USB2.0 Specification and pass USB2.0 certification tests. For a modulation rate around 60 KHz an attenuation of 6.38 dB was achieved for the fundamental 480 MHz frequency. For a modulation rate of 45 KHz and attenuation of 6.83 dB was achieved at the fundamental frequency of 480 MHz.

It is significant and unforeseen that the invention provides spread spectrum attenuation of EMI spectral components while remaining within the rigid specifications of USB 2.0. This is a new and unexpected result, given the fact that it is generally believed by those skilled in the art that the rigid specifications of USB 2.0 do not provide any opportunity to spread the USB data signal. For this reason, no spread spectrum USB 2.0 systems are currently available.

BRIEF DESCRIPTION OF THE DRAWING

FIG. 2 is a chart depicting calculated MatLab™ 480 MHz fundamental harmonic attenuation (center) values for various modulation rates applied to a triangular modulation envelope of a spread spectrum modulation of a 480 MHz USB data signal. In FIG. 2 the "center" is the 480 MHz fundamental frequency amplitude. The "bands" are the fundamental frequency sidebands when spread-spectrum is present. dB measurements are relative. At any given modulation rate (MR) the "center" frequency deviation is maintained within a fixed +/−240 KHz boundary.

DETAILED DESCRIPTION OF THE INVENTION

The present invention generally comprises a method for applying spread spectrum noise reduction techniques to USB communications systems without violating the strict USB standards. The USB 2.0 signaling rate is 480 MHz±240 KHz, which may be expressed as 480 MHz±0.05%, or ±500 ppm. Even though individual bits may violate the signaling rate limits at an individual bit-length level, the overall average frequency of the test packet must be within the +/−500 ppm specified limits. Typical prior art spread spectrum techniques employ a frequency deviation factor in the range of ±0.25%-±5%. Clearly typical SS techniques fall far outside the narrowly drawn USB standards.

Applicants have determined that SS techniques that meet the stringent USB frequency deviation standards are capable of achieving significant EMI reduction, and have passed the strict USB certification process. For example, applicant has applied SS modulation to the USB carrier signal of 480 MHz, using differing modulation rates that range from 40 KHz-150 KHz. As shown in FIG. 2, the noise signal level at the center (480 MHz) frequency, as well as the noise levels at four side bands of the fundamental (480 MHz) harmonic above and below the center frequency are charted. In addition, the maximum peak amplitude of the harmonic bands is given, as is the attenuation factor for the center frequency at each modulation rate. It is noted that the modulation rate of 125 KHz yields an attenuation rate of 4.61 dB. This modulation rate is significant in view of a specific FCC testing standard, the "sliding window filter", which has a bandwidth of 120 KHz. Thus one embodiment of the invention is to spread spectrum modulate the USB data signal at 125 KHz, using either a triangular modulation profile or a random or pseudo-random modulation scheme to achieve significant EMI reductions.

Figure 1:
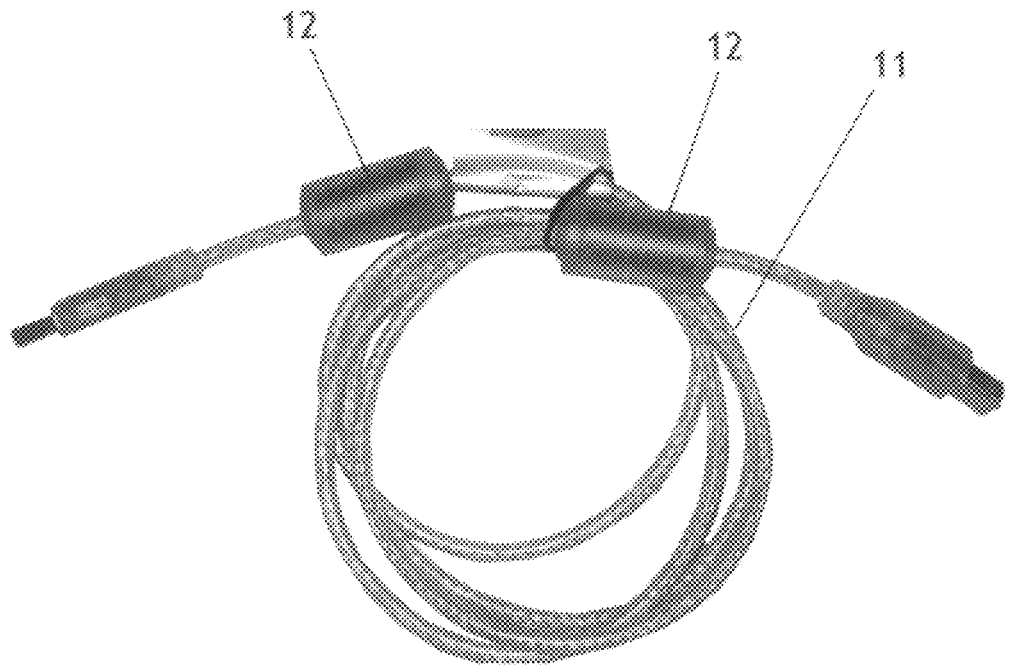
FIG. 1 is a pictorial depiction of a typical USB cable device known in the prior art.
Figure 3:
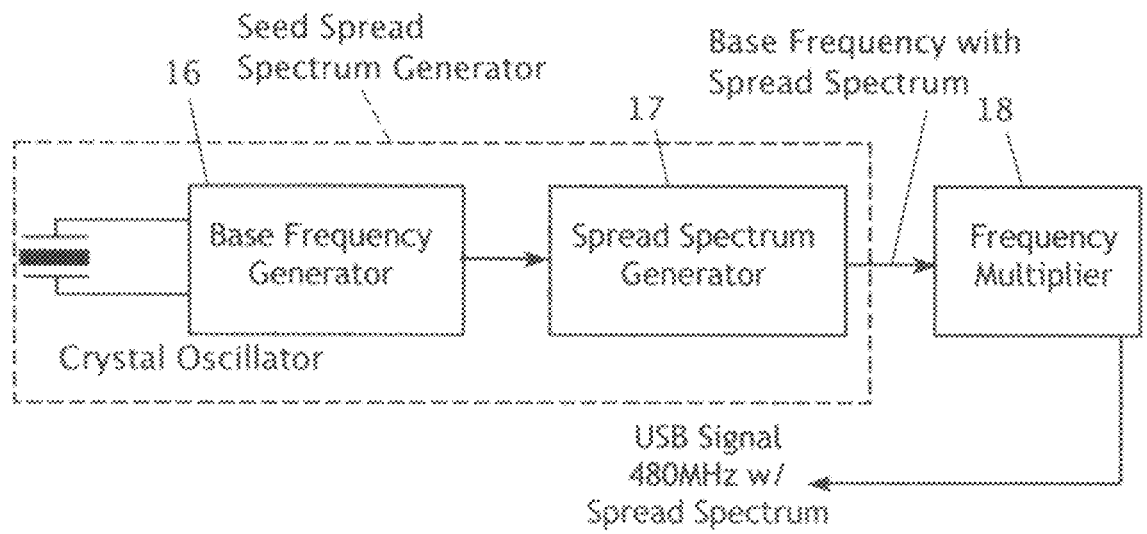
FIG. 3 is a functional block diagram depicting the steps required to spread spectrum modulate a USB data signal.

The USB 2.0 clock frequency of 480 MHz is typically generated by first generating an unmodulated base (seed) frequency, for example 48 MHz, and then employing a PLL circuit to multiply that frequency by a factor of 10. Alternatively, the base (seed) frequency generator may be set for 12 MHz, 24 MHz, 25 MHz, or 48 MHz, followed by multiplication devices of 40×, 20×, 19.2× or 10× (respectively) One key to the modulation scheme of the invention is that the spread spectrum modulation is applied to the base (seed) frequency before it is multiplied. Thus, as shown in FIG. 3, the base (seed) frequency from generator 16 is fed to a spread spectrum generator 17 that applies the spread spectrum modulation while staying within the USB 2.0 specification limits for frequency variation of the base (seed) frequency. The resulting modulated signal is then fed to the frequency multiplier (USB2.0 ASIC, SATA ASIC), the value of which is set so that the output thereof is the 480 MHZ USB2.0 data signal. This output signal thereby incorporates spread spectrum characteristics that likewise fall within the frequency range of the USB specifications.

Figure 4A:
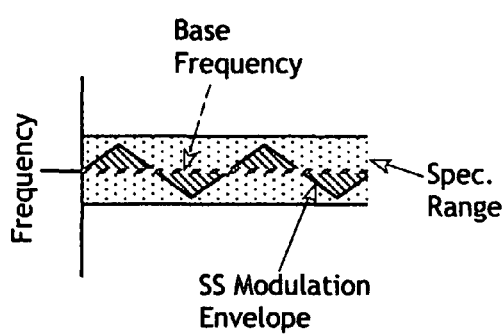
FIG. 4A is a graphic depiction of spread spectrum modulation applied to the USB base (seed) frequency.
Figure 4B:
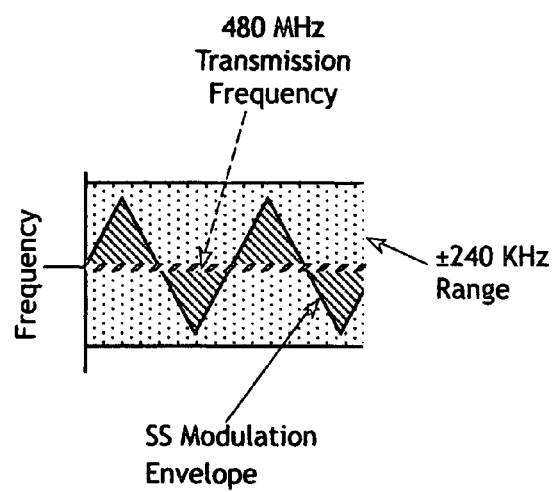
FIG. 4B depicts the multiplied USB data signal with the presently disclosed spread spectrum modulation.

These relationships are depicted graphically in FIG. 4A. The base (seed) frequency is centered in its specification range of ±0.05% variance from the center of the base (seed) frequency. The spread spectrum generator 17 modulates the base (seed) frequency within a SS modulation envelope, in this case a triangular envelope (many others are known in the prior art and are adoptable). It is significant that the modulation envelope does not transgress outside of the limits of the USB2.0 specification for the average data rate accuracy range. With regard to FIG. 4B, when the base (seed) frequency is multiplied by device 18 (the USB2.0 ASIC), the USB specification frequency range is expanded to ±240 KHz. Likewise, the SS modulation envelope is also expanded in its frequency range, so that it occupies the same ratio of the specification range as before. Thus the SS modulation continues not to violate the USB standards, and normal USB signal transmission may occur without any hindrance or obstacle.

EXAMPLES 1) 480 MHz+/−240 KHz average signaling speed (average data rate), or 480 MHz +/−500 ppm at 480 MHz center.
2) Divide 480 MHz by 10 and arrive at 48 MHz. The target output (1) translates/scales down/ to 48 MHz+/−24 KHz or again 48 MHz+/−500 ppm at 48 MHz center.
3) Divide 480 MHz by 20 and arrive at 24 MHz. The target output (1) translates/scales down/ to 24 MHz+/−12 KHz or again 24 MHz+/−500 ppm at 24 MHz center.
4) Divide 480 MHz by 19.2 and arrive at 25 MHz. Similar scaling procedure as above. In this case the USB2.0 ASIC is incorporated into a SATA ASIC for external, USB2.0 connected hard disk drives.
5) Divide 480 MHz by 40 and arrive at 12 MHz. The target output (1) translates/scales down/ to 12 MHz+/−6 KHz or again 12 MHz+/−500 ppm at 12 MHz center.

Despite the fact that the spread spectrum modulation is so small that it meets the USB standards, the modulated signal exhibits significant reductions in EMI spectral amplitudes. With regard to FIG. 2, a MatLab™ simulation of spread spectrum modulation effects on spectral components of a 480 MHz signal yields some interesting results. For example, at a modulation rate of 125 KHz (triangular modulation envelope), the fundamental (center) frequency amplitude is reduced from 17.55 db to 12.68 db, and the maximum peak spectral amplitude is 12.94, which is a reduction of 4.61 db from the maximum of 17.55 db. This reduction is greater than the 3 db half-power level, a figure of merit that is often quoted in electronic specifications. This reduction is quite noteworthy, since it represents a substantial improvement in the signal to noise (S/N) ratio. Other modulation rates such as 120 KHz yield similar results.

It is noted that a typical crystal oscillator used to produce the 12 MHZ, 24 MHZ, 25 MHz, or 48 MHz base (seed) frequency will be accurate ±20 ppm. When the SS modulation of the invention is applied, it remains within the overall ±500 ppm limit for USB signals. Thus the SS modulation is 25 times greater than the crystal oscillator itself, a factor that enables significant SS EMI reduction within the USB specification limits.

Figure 5:
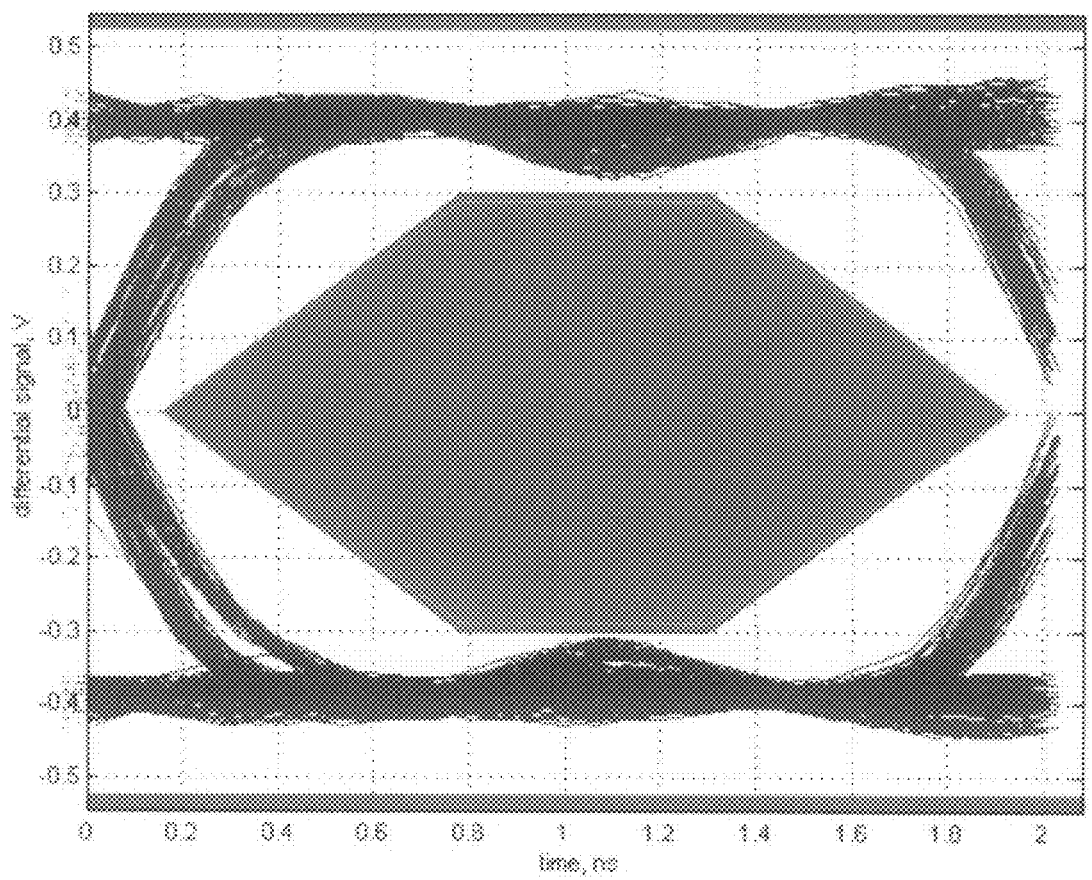
FIG. 5 is one example of the Eye Chart test that has been passed by the USB SS modulation scheme of the present invention.
Figure 6:
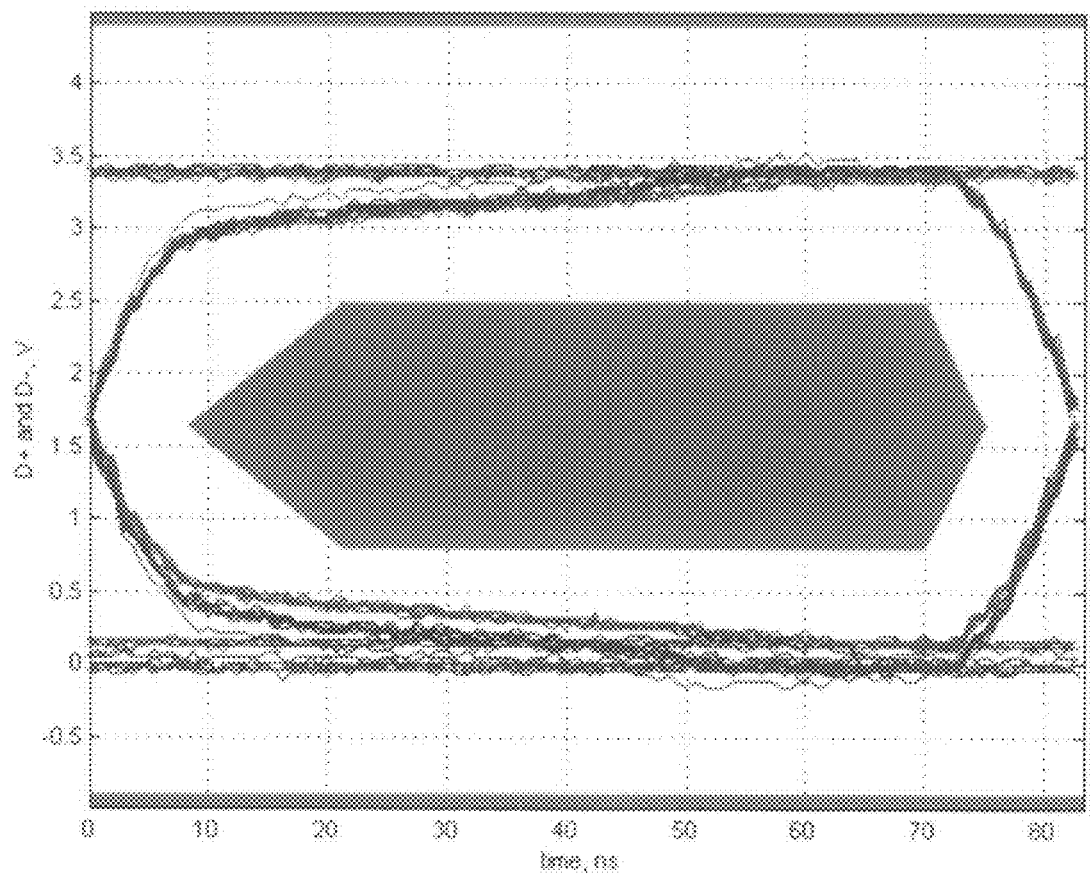
FIG. 6 is another example of the Eye Chart test that has been passed by the USB SS modulation scheme of the present invention.

FIG. 5 depicts the Eye Diagram test for the SS modulated USB signal. The Near End Full Speed Signal Quality Test Results are that none of the signal pulse traces enter the forbidden zone of the "pupil" of the Eye Diagram, and that the SS modulated USB signal thus achieved acceptable results and passed the Eye Diagram test. This outcome signifies that SS EMI reduction is achieved by the present invention without diminishing the throughput of the USB system. Likewise, FIG. 6 depicts the Far End Full Speed Signal Quality Test Results, and indicates similar successful results.

Figure 4C:
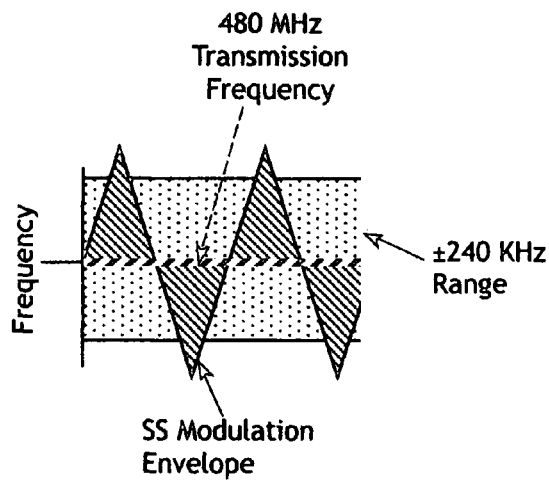
FIG. 4C depicts the multiplied USB data signal SS modulated to exceed the USB specification for average signaling rate (failing signaling rate tests at peak frequency deviations).

With regard to FIG. 4C, it has been found that this invention can be broadened by pushing the modulation envelope to extend beyond the signaling speed restrictions and limitations of the USB signal. Initial experimental results indicate that the USB system will continue to function without an increase in error rate when the frequency is pushed to ±1000-2000 ppm beyond the center frequency. At this modulation level, the SS variation can be up to 100 times the variability of the crystal oscillator, with associated significant amplitude reduction of the 480 MHz fundamental and its harmonics.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A method for applying spread spectrum EMI reduction to a USB system, including the steps of:
    generating a base signal at a constant frequency for the USB system;
    applying a spread spectrum modulation scheme to said base signal;
    multiplying the frequency of said base signal by a factor so that the base signal frequency equals the USB standard frequency of 480MHz and the spread spectrum modulation is also multiplied by said factor;
    wherein said spread spectrum modulation scheme is defined by a modulation envelope, and said modulation envelope has a frequency range that is less than the specification limit in the USB2.0 standard for the allowable accuracy of the average signaling rate.

2. The method of claim 1, wherein said spread spectrum modulation scheme has a modulation rate of about 125MHz, and said modulation envelope is a triangular form.

3. A method for applying spread spectrum EMI reduction to a USB system including the steps of:
    generating a base signal at a constant frequency for the USB system;
    applying a spread spectrum modulation scheme to said base signal;
    multiplying the frequency of said base signal by a factor so that the base signal frequency equals the USB standard frequency of 480MHz and the spread spectrum modulation is also multiplied by said factor;
    wherein said spread spectrum modulation scheme is defined by a modulation envelope, and said modulation envelope has a frequency range that is greater than the deviation specification limit for the USB standard frequency.

* * * * *